US012641528B2

(12) United States Patent
Venkataramu et al.

(10) Patent No.: US 12,641,528 B2
(45) Date of Patent: May 26, 2026

(54) SYSTEMS AND METHODS FOR ALLOCATING NETWORK SLICES TO APPLICATIONS VIA A NETWORK ENABLED FUNCTION

(71) Applicant: Verizon Patent and Licensing Inc., Basking Ridge, NJ (US)

(72) Inventors: Praveen Venkataramu, Raritan, NJ (US); Mahadevan Viswanathan, HillsBorough, NJ (US); Utpal Khanvilkar, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 376 days.

(21) Appl. No.: 18/533,317

(22) Filed: Dec. 8, 2023

(65) Prior Publication Data

US 2025/0193777 A1     Jun. 12, 2025

(51) Int. Cl.
*H04W 48/16* (2009.01)
*H04W 8/24* (2009.01)

(52) U.S. Cl.
CPC ............. *H04W 48/16* (2013.01); *H04W 8/24* (2013.01)

(58) Field of Classification Search
CPC ................................ H04W 48/16; H04W 8/24
See application file for complete search history.

(56) References Cited

U.S. PATENT DOCUMENTS

| | | | |
|---|---|---|---|
| 2021/0153287 A1* | 5/2021 | Salkintzis | H04W 48/18 |
| 2022/0201601 A1* | 6/2022 | Cai | H04W 8/20 |
| 2025/0008309 A1* | 1/2025 | Kim | H04W 60/00 |

* cited by examiner

*Primary Examiner* — Elton Williams

(57) ABSTRACT

A device may receive data identifying network slices and applications permitted on the network slices, and data identifying addresses of the applications permitted on the network slices. The device may provide, to a UE, a list of the network slices and the applications permitted on the network slices, and may receive, from the UE, a UE identifier and subscribed to applications from the list. The device may create rules for the subscribed to applications and corresponding network slices, and may associate the rules for the subscribed to applications and the corresponding network slices with the UE identifier. The device may receive, from a network function, a request for the rules associated with the UE identifier, the subscribed to applications, and the corresponding network slices, and may provide, based on the request, the rules to the UE via the network function.

20 Claims, 8 Drawing Sheets

100 ⟶

160
Receive a request for the rules associated with the UE identifier, the subscribed to applications, and the corresponding network slices

165
Provide the rules based on the request

155
Receive a network attach that includes the UE identifier

170
Provide the rules to the UE

SPM 120

DNS

PCF

UPF

UPF

SMF

AMF

RAN 110

UE 105

App 1

App 2

App 3

100

195

Utilize the rules to separate the subscribed to applications onto the corresponding network slices for uplink traffic

197

Utilize the rules to separate the subscribed to applications onto the corresponding network slices for downlink traffic

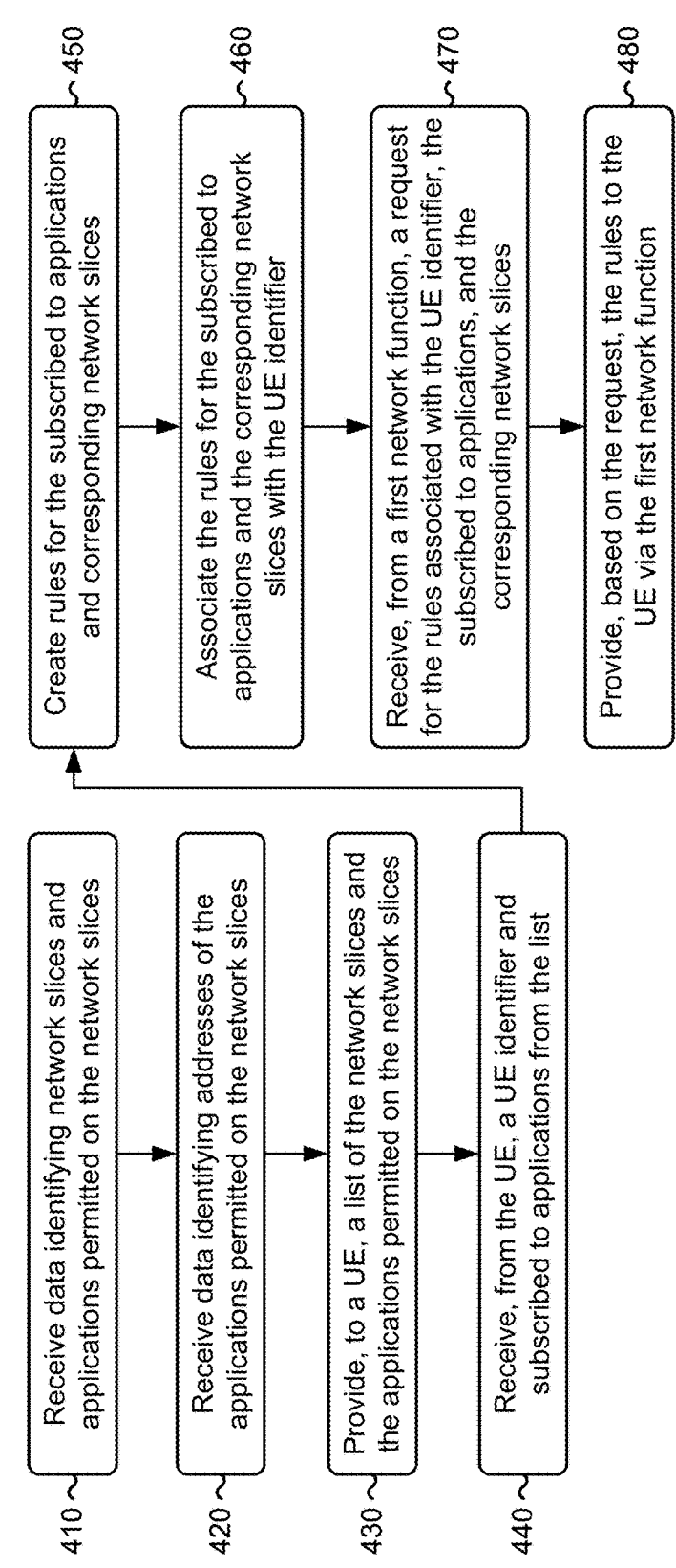

400

410 — Receive data identifying network slices and applications permitted on the network slices 420 — Receive data identifying addresses of the applications permitted on the network slices 430 — Provide, to a UE, a list of the network slices and the applications permitted on the network slices 440 — Receive, from the UE, a UE identifier and subscribed to applications from the list 450 — Create rules for the subscribed to applications and corresponding network slices 460 — Associate the rules for the subscribed to applications and the corresponding network slices with the UE identifier 470 — Receive, from a first network function, a request for the rules associated with the UE identifier, the subscribed to applications, and the corresponding network slices 480 — Provide, based on the request, the rules to the UE via the first network function

FIG. 4

SYSTEMS AND METHODS FOR ALLOCATING NETWORK SLICES TO APPLICATIONS VIA A NETWORK ENABLED FUNCTION

BACKGROUND

Network slicing provides a virtual network that enables a wireless user (e.g., a fifth generation (5G) wireless user) to receive guaranteed performance and thus a consistent quality of experience for applications.

BRIEF DESCRIPTION OF THE DRAWINGS

FIG. 4 is a flowchart of an example process for allocating network slices to applications via a network enabled function.

DETAILED DESCRIPTION OF EXAMPLE EMBODIMENTS

Figure 1A:
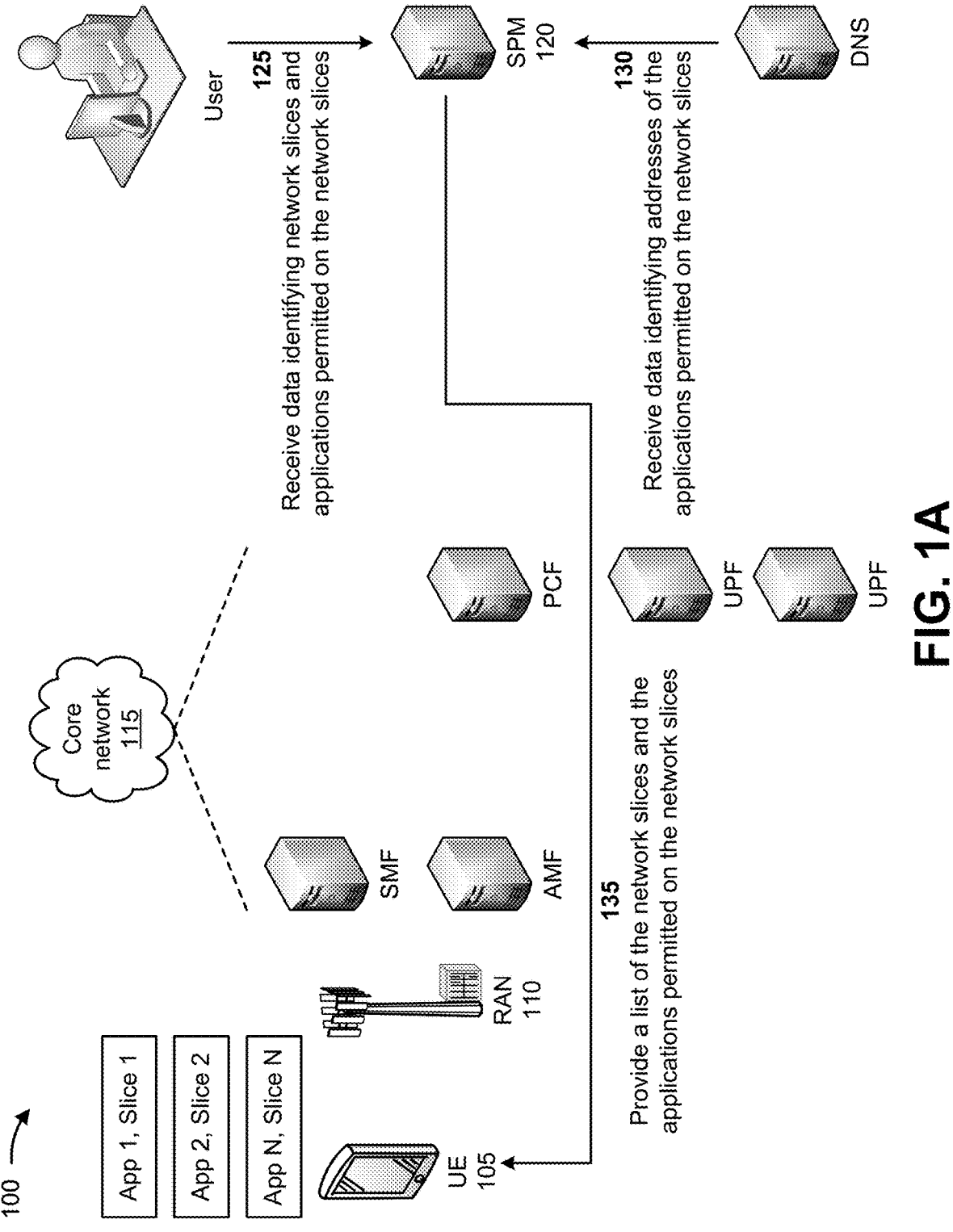
FIGS. 1A-1E are diagrams of an example associated with allocating network slices to applications via a network enabled function.

The following detailed description of example implementations refers to the accompanying drawings. The same reference numbers in different drawings may identify the same or similar elements.

For network slicing to function, applications on a user equipment (UE) (e.g., a mobile device) need to be associated with an appropriate network slice. In one technique for associating an application with a network slice, the application of the UE may be aware of network slicing and may request a modem of the UE to use a specific network slice for traffic flows of the application. This technique is not scalable since every application needs to be aware of network slicing and being able to communicate with the modem of the UE. In another technique for associating an application with a network slice, an operating system or an application manager of the UE may identify application traffic and may route the application traffic to a network slice on an uplink (e.g., from the UE to a network). This technique requires the operating system of the UE to share traffic flow information with the network so that the network can apply traffic descriptors for downlink traffic. The aforementioned techniques depend upon the application, the operating system of the UE, or the application manager of the UE to provide traffic flow information to the network. However, there is no mechanism that dynamically shares traffic descriptors from the UE to the network. Additionally, operating systems and application managers may be prevented from sharing customer application flow information with the network.

Thus, current techniques for associating an application with a network slice consume computing resources (e.g., processing resources, memory resources, communication resources, and/or the like), networking resources, and/or other resources associated with the application failing to be aware of network slicing; the application failing to communicate with a modem of a UE; the application, an operating system of the UE, or an application manager of the UE failing to provide application traffic flow information to a network; and/or the like.

Some implementations described herein provide a device (e.g., a slicing policy manager (SPM)) that allocates network slices to applications via a network enabled function. For example, the device may receive data identifying network slices and applications permitted on the network slices, and may receive data identifying addresses of the applications permitted on the network slices. The device may provide, to a UE, a list of the network slices and the applications permitted on the network slices, and may receive, from the UE, a UE identifier and subscribed to applications from the list. The device may create rules for the subscribed to applications and corresponding network slices, and may associate the rules for the subscribed to applications and the corresponding network slices with the UE identifier. The device may receive, from a first network function, a request for the rules associated with the UE identifier, the subscribed to applications, and the corresponding network slices, and may provide, based on the request, the rules to the UE via the first network function. The device may receive, from a second network function, another request for the rules, and may provide, to the second network function, the rules based on the other request and to cause the second network function to set up traffic flows in one or more third network functions based on the rules.

In this way, the SPM allocates network slices to applications via a network enabled function. For example, the SPM may manage network slices used by an application of a UE without a need for complex dependencies on application development or UE and/or modem changes. The SPM may track addresses of application services end points on a network and may maintain updated network slice usage policies that may be provided to the UE and/or the network on demand. The SPM may control network slice selection for traffic flows from the network instead of from the UE. Thus, the SPM may conserve computing resources, networking resources, and/or other resources that would have otherwise been consumed by the application failing to be aware of network slicing; the application failing to communicate with a modem of a UE; the application, an operating system of the UE, or an application manager of the UE failing to provide application traffic flow information to a network; and/or the like.

FIGS. 1A-1E are diagrams of an example 100 associated with allocating network slices to applications via a network enabled function. As shown in FIGS. 1A-1E, the example 100 includes a user equipment (UE) 105, a radio access network (RAN) 110, and a core network 115 that includes a session management function (SMF), an access and mobility management function (AMF), a policy control function (PCF), and user plane functions (UPFs). As further shown, the example 100 includes a slicing policy manager (SPM) 120 associated with a user (e.g., a network administrator), and a domain name server (DNS). Further details of the UE 105, the RAN 110, the core network 115, the SMF, the AMF, the PCF, the UPFs, the SPM 120, and the DNS are provided elsewhere herein. Although implementations are described in connection with a 5G core network, the implementations may be utilized with other types of core networks, such as a fourth generation (4G) core network.

As shown in FIG. 1A, and by reference number 125, the SPM 120 may receive data identifying network slices and applications permitted on the network slices. For example, a network administrator may be associated with the core network 115 and/or the SPM 120. In some implementations, the SPM 120 may provide (e.g., display) to the network administrator a user interface that enables the network administrator to input data identifying network slices available on the core network 115, applications permitted on the network slices, traffic flows (e.g., network (e.g., Internet protocol (IP)) addresses and ports) permitted on the network slices, and/or the like. The SPM 120 may receive the data identifying network slices and applications permitted on the network slices from the network administrator via the user interface or via a user device associated with the network administrator. In some implementations, the network administrator may modify (e.g., add, delete, and/or the like) one or more of the available network slices, the applications permitted on the network slices, and/or the traffic flows permitted on the network slices.

As further shown in FIG. 1A, and by reference number 130, the SPM 120 may receive data identifying addresses of the applications permitted on the network slices. For example, the SPM 120 may be associated with a DNS that stores addresses (e.g., IP addresses) of applications available to the UE 105 via the RAN 110 and the core network 115. In some implementations, the SPM 120 may periodically provide, to the DNS, a query for the addresses of all applications served by the network slices of the core network 115. The DNS may receive the query from the SPM 120, and may provide the data identifying the addresses of the applications permitted on the network slices to the SPM 120 based on the query. In some implementations, the SPM 120 may query the DNS in real time to receive data identifying the addresses of the applications permitted on the network slices in real time. In some implementations, the SPM 120 may continuously receive the data identifying the addresses of the applications permitted on the network slices from the DNS, may periodically receive the data identifying the addresses of the applications permitted on the network slices from the DNS (e.g., without a query), and/or the like. The data identifying the addresses of the applications permitted on the network slices may enable the SPM 120 to provide a faster response to a network query for network rules, such as UE route selection policy (URSP) rules. A device may be provisioned with URSP rules that indicate which protocol data unit (PDU) session of a network slice a service or an application should use when activated.

As further shown in FIG. 1A, and by reference number 135, the SPM 120 may provide a list of the network slices and the applications permitted on the network slices to the UE 105. For example, the SPM 120 may generate the list of the network slices and the applications permitted on the network slices based on the data identifying the network slices and the applications permitted on the network slices, and the data identifying the addresses of the applications permitted on the network slices. The list may include the identified network slices, the addresses of the identified network slices, and the applications permitted on the identified network slices. In some implementations, the SPM 120 may provide the list of the network slices and the applications permitted on the network slices to the UE 105 via the RAN 110 and the core network 115. In some implementations, the SPM 120 may provide the list of the network slices and the applications permitted on the network slices to the UE 105 via another network (e.g., a wireless network, the Internet, and/or the like) connecting the UE 105 and the SPM 120. The UE 105 may receive a list of the network slices and the applications permitted on the network slices from the SPM 120. As further shown, the list may include a first application (App 1), a second application (App 2), . . .

, and an Nth application (App N) and a first network slice (Slice 1), a second network slice (Slice 2), . . . , and an Nth network slice (Slice N).

Figure 1B:
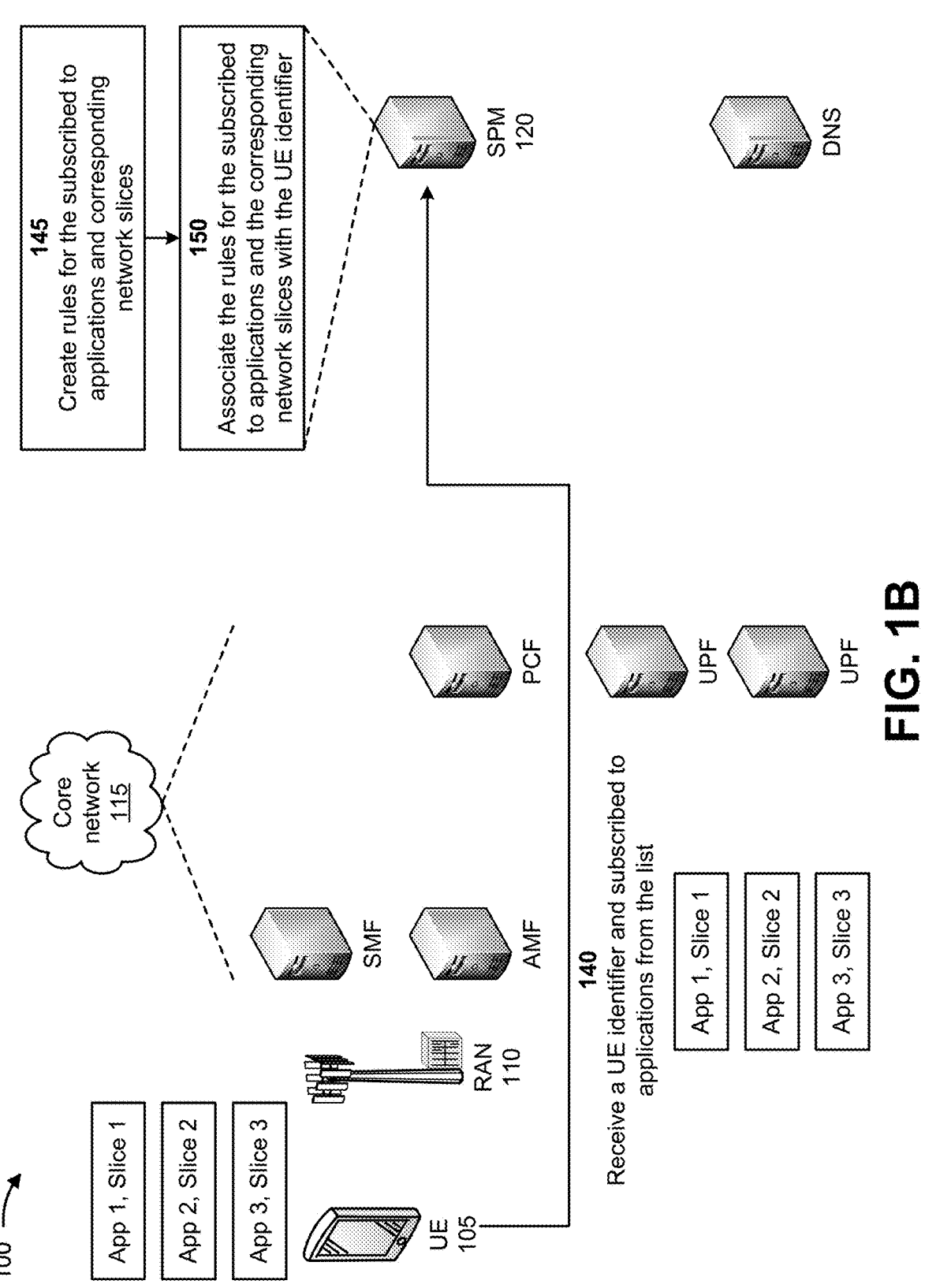

As shown in FIG. 1B, and by reference number 140, the SPM 120 may receive a UE identifier and subscribed to applications from the list. For example, the UE 105 may display the list of the network slices and the applications permitted on the network slices to a user of the UE 105. This may enable the user to subscribe to network slices and to associate specific applications or application groups with the subscribed-to network slices. The user may utilize the UE 105 to subscribe to applications from the list of the network slices and the applications permitted on the network slices. For example, the user may indicate that the first application (App 1) is to utilize the first network slice (Slice 1), the second application (App 2) is to utilize the second network slice (Slice 2), and the third application (App 3) is to utilize the third network slice (Slice 3). The UE 105 may provide a UE identifier (e.g., a subscription permanent identifier (SUPI), a subscriber concealed identifier (SUCI), and/or the like) and the subscribed to applications to the SPM 120. In some implementations, the SPM 120 may receive the UE identifier and the subscribed to applications from the UE 105 via the RAN 110 and the core network 115. In some implementations, the SPM 120 may receive the UE identifier and the subscribed to applications from the UE 105 via another network connecting the UE 105 and the SPM 120.

As further shown in FIG. 1B, and by reference number 145, the SPM 120 may create rules for the subscribed to applications and corresponding network slices. For example, the SPM 120 may create rules (e.g., URSP rules) based on the subscribed to applications and the corresponding network slices. Each of the URSP rules may indicate which PDU session of one of the corresponding network slices one of the subscribed to applications should utilize when activated. In some implementations, the rules for the subscribed to applications and the corresponding network slices may include data identifying addresses of the subscribed to applications, ports associated with the subscribed to applications, network slice identifiers of the corresponding network slices, a DNS associated with the subscribed to applications, and/or the like. In some implementations, the SPM 120 may create other rules (e.g., other URSP rules) for other UEs 105 associated with the RAN 110 and the core network 115 in a similar manner.

As further shown in FIG. 1B, and by reference number 150, the SPM 120 may associate the rules for the subscribed to applications and the corresponding network slices with the UE identifier. For example, the SPM 120 may associate the rules for the subscribed to applications and the corresponding network slices with the UE identifier of the UE 105 so that the SPM 120 may quickly identify the rules based on the UE identifier. In some implementations, the SPM 120 may associate the other rules, for other applications and other corresponding network slices, with other UE identifiers of the other UEs 105 associated with the RAN 110 and the core network 115. The SPM 120 may store the rules, the UE identifier, the other rules, and the other UE identifiers in a data structure (e.g., a database, a list, a table, and/or the like) associated with the SPM 120.

Figure 1C:
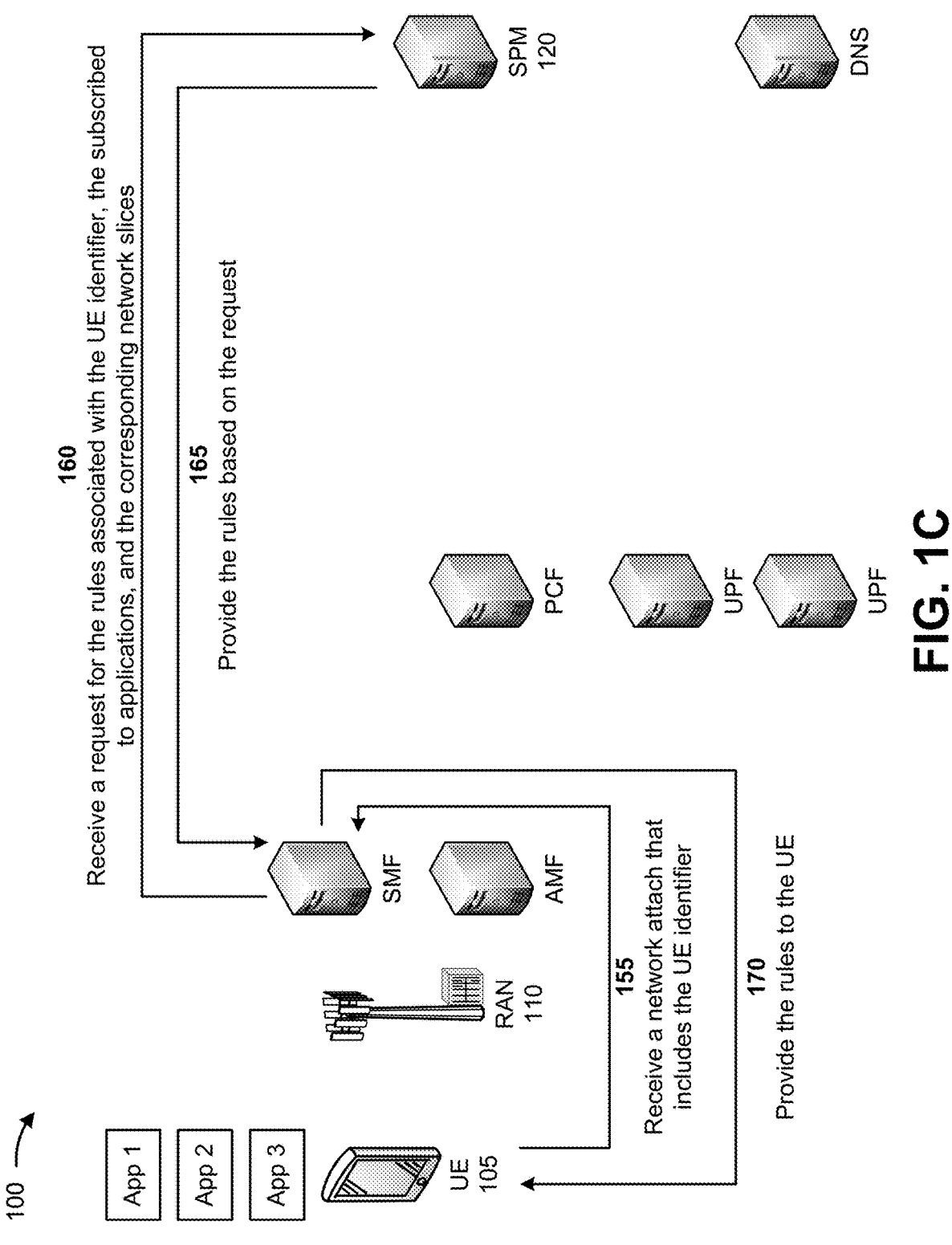

As shown in FIG. 1C, and by reference number 155, the SMF may receive, from the UE 105, a network attach that includes the UE identifier. For example, after subscribing to the applications from the list of the network slices and the applications permitted on the network slices, the user may cause the UE 105 to generate the network attach that includes the UE identifier of the UE 105. The UE 105 may provide the network attach to the RAN 110, and the RAN 110 may provide the network attach to the core network 115. The core network 115 may route the network attach with the UE identifier to the SMF, and the SMF may receive the network attach that includes the UE identifier.

As further shown in FIG. 1C, and by reference number 160, the SPM 120 may receive a request for the rules associated with the UE identifier, the subscribed to applications, and the corresponding network slices. For example, when the SMF receives the network attach with the UE identifier, the SMF may generate a request for the rules associated with the UE identifier, the subscribed to applications associated with the UE identifier, and the corresponding network slices associated with the UE identifier. The SMF may provide the request for the rules associated with the UE identifier, the subscribed to applications, and the corresponding network slices to the SPM 120. The SPM 120 may receive the request for the rules associated with the UE identifier, the subscribed to applications, and the corresponding network slices from the SMF.

As further shown in FIG. 1C, and by reference number 165, the SPM 120 may provide the rules based on the request. For example, the SPM 120 may utilize the UE identifier in the request to search for (e.g., in the data structure associated with the SPM 120) the rules for the subscribed to applications and the corresponding network slices that are associated with the UE identifier. The SPM 120 may retrieve the rules for the subscribed to applications and the corresponding network slices from the data structure, and may provide the rules for the subscribed to applications and the corresponding network slices to the SMF. The SMF may receive the rules for the subscribed to applications and the corresponding network slices from the SPM 120. In some implementations, the SMF may store the rules for the subscribed to applications and the corresponding network slices in a data structure associated with the SMF.

As further shown in FIG. 1C, and by reference number 170, the SMF may provide the rules to the UE 105. For example, when the SMF receives the rules for the subscribed to applications and the corresponding network slices, the SMF may provide the rules for the subscribed to applications and the corresponding network slices to the UE 105, via the RAN 110. The UE 105 may receive the rules for the subscribed to applications and the corresponding network slices, and may store the rules in a data structure associated with the UE 105.

Figure 1D:
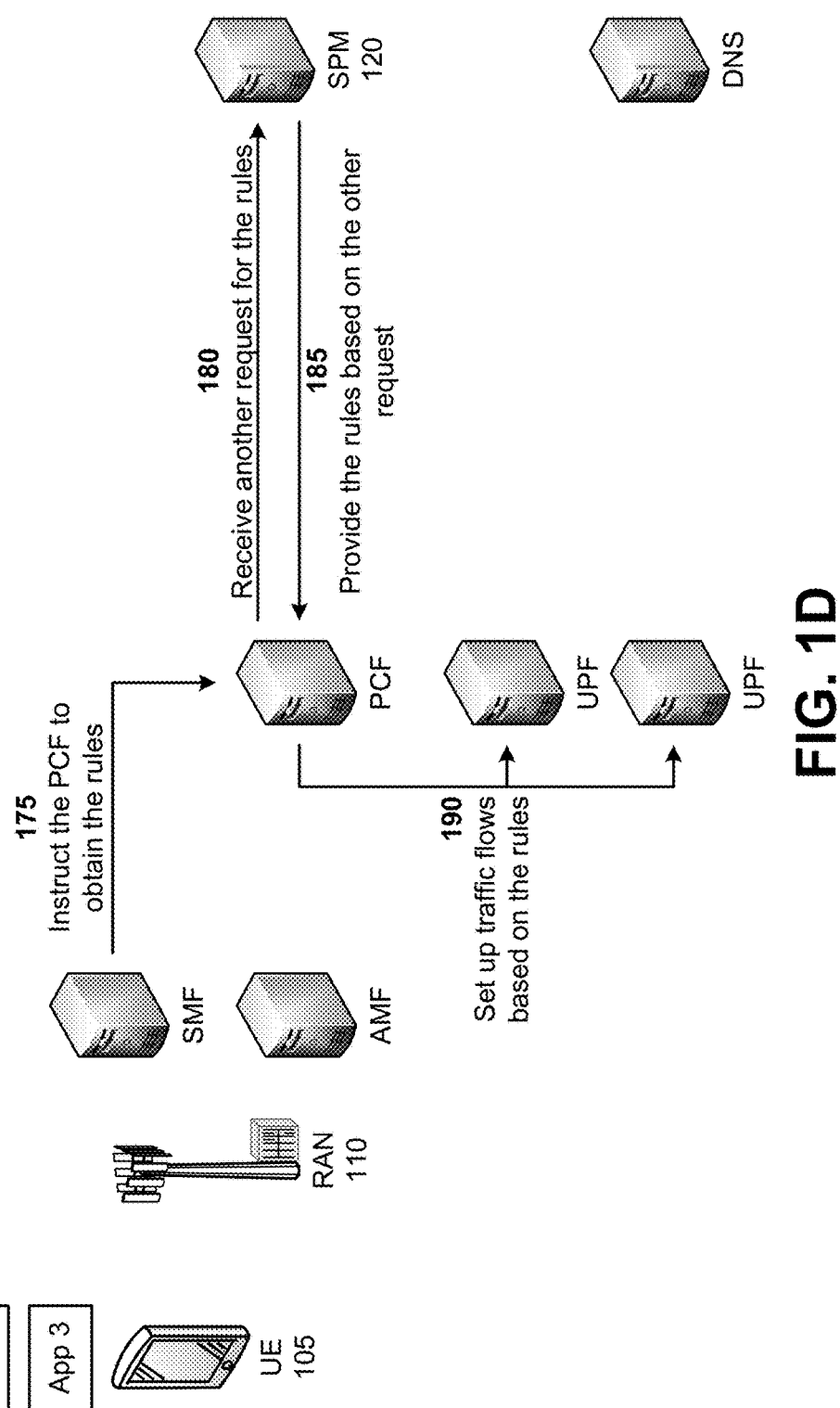

As shown in FIG. 1D, and by reference number 175, the SMF may instruct the PCF to obtain the rules. For example, in order for the core network 115 to set up traffic flows for the subscribed to applications on the corresponding network slices, the PCF may require the rules for the subscribed to applications and the corresponding network slices. Unlike the SMF, the PCF may be unaware of the rules for the subscribed to applications and the corresponding network slices. Thus, the SMF may instruct the PCF to retrieve the rules for the subscribed to applications and the corresponding network slices from the SPM 120. In some implementations, the SMF may provide the UE identifier with the instruction to retrieve the rules for the subscribed to applications and the corresponding network slices.

As further shown in FIG. 1D, and by reference number 180, the SPM 120 may receive another request for the rules from the PCF. For example, when the PCF receives the instruction to retrieve the rules for the subscribed to applications and the corresponding network slices from the SMF, the PCF may generate another request for the rules associated with the UE identifier, the subscribed to applications associated with the UE identifier, and the corresponding network slices associated with the UE identifier. The PCF may provide the other request for the rules associated with the UE identifier, the subscribed to applications, and the corresponding network slices to the SPM 120. The SPM 120 may receive the other request for the rules associated with the UE identifier, the subscribed to applications, and the corresponding network slices from the PCF.

As further shown in FIG. 1D, and by reference number 185, the SPM 120 may provide, to the PCF, the rules based on the other request. For example, the SPM 120 may utilize the UE identifier in the other request to search for (e.g., in the data structure associated with the SPM 120) the rules for the subscribed to applications and the corresponding network slices that are associated with the UE identifier. The SPM 120 may retrieve the rules for the subscribed to applications and the corresponding network slices from the data structure, and may provide the rules for the subscribed to applications and the corresponding network slices to the PCF. The PCF may receive the rules for the subscribed to applications and the corresponding network slices from the SPM 120. In some implementations, the PCF may store the rules for the subscribed to applications and the corresponding network slices in a data structure associated with the PCF.

As further shown in FIG. 1D, and by reference number 190, the PCF may set up traffic flows in the UPFs based on the rules. For example, the PCF may utilize the rules for the subscribed to applications and the corresponding network slices to set up traffic flows for the subscribed to applications (e.g., App 1, App 2, and App 3) in the UPFs. In some implementations, the UPFs may utilize the rules for the subscribed to applications and the corresponding network slices to indicate which PDU sessions of the corresponding network slices the subscribed to applications should utilize when activated. For example, the UPFs may indicate that a PDU session for the first application (App 1) is to utilize the first network slice (Slice 1) when activated, that a PDU session for the second application (App 2) is to utilize the second network slice (Slice 2) when activated, and that a PDU session for the third application (App 3) is to utilize the third network slice (Slice 3) when activated. As shown, a first UPF may be associated with the first application, the second application, the first network slice, the second network slice, and a first data network name (DNN 1); and a second UPF may be associated with the third application, the third network slice, and a second data network name (DNN 2). DNN 1 may be associated with a first application service (App 1 service) and a second application service (App 2 service), and DNN 2 may be associated with a third application service (App 3 service).

Figure 1E:
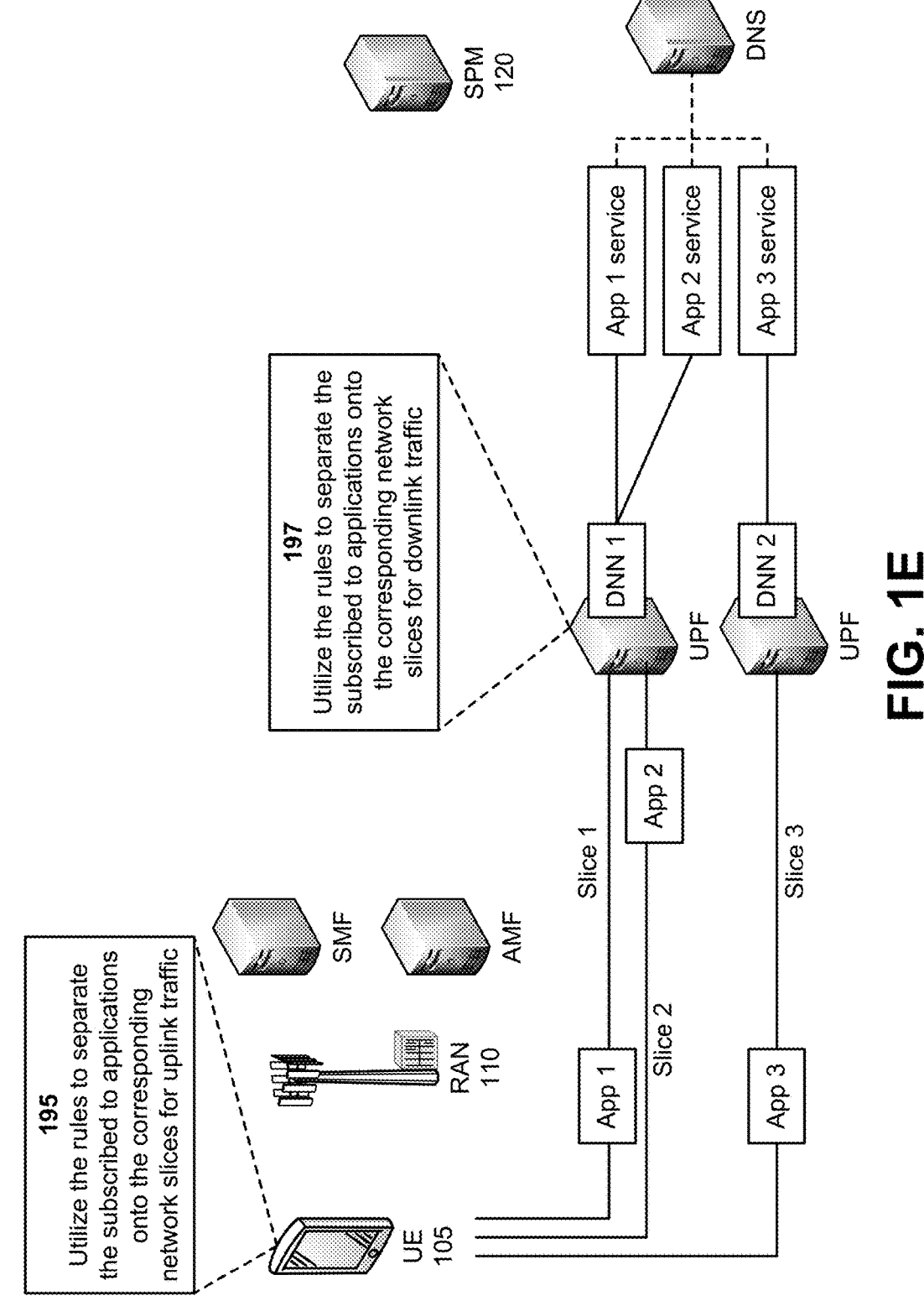

As shown in FIG. 1E, and by reference number 195, the UE 105 may utilize the rules to separate the subscribed to applications onto the corresponding network slices for uplink traffic. For example, the UE 105 may utilize the rules for the subscribed to applications and the corresponding network slices to separate uplink traffic associated with the subscribed to applications onto the corresponding network slices. As shown, the UE 105 may provide uplink traffic associated with the first application onto the first network slice, may provide uplink traffic associated with the second application onto the second network slice, and may provide uplink traffic associated with the third application onto the third network slice.

As further shown in FIG. 1E, and by reference number 197, the UPFs may utilize the rules to separate the subscribed to applications onto the corresponding network slices for downlink traffic. For example, the UPFs may utilize the rules for the subscribed to applications and the corresponding network slices to separate downlink traffic associated with the subscribed to applications onto the corresponding network slices. As shown, the first UPF may provide downlink traffic associated with the first application onto the first network slice and may provide downlink traffic associated with the second application onto the second network slice. The second UPF may provide downlink traffic associated with the third application onto the third network slice.

In this way, the SPM 120 allocates network slices to applications via a network enabled function. For example, the SPM 120 may manage network slices used by an application of a UE 105 without a need for complex dependencies on application development or UE 105 and/or modem changes. The SPM 120 may track addresses of application services end points on a network and may maintain updated network slice usage policies that may be provided to the UE 105 and/or the network on demand. The SPM 120 may control network slice selection for traffic flows from the network instead of from the UE 105. Thus, the SPM 120 may conserve computing resources, networking resources, and/or other resources that would have otherwise been consumed by the application failing to be aware of network slicing; the application failing to communicate with a modem of a UE 105; the application, an operating system of the UE, or an application manager of the UE 105 failing to provide application traffic flow information to a network; and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
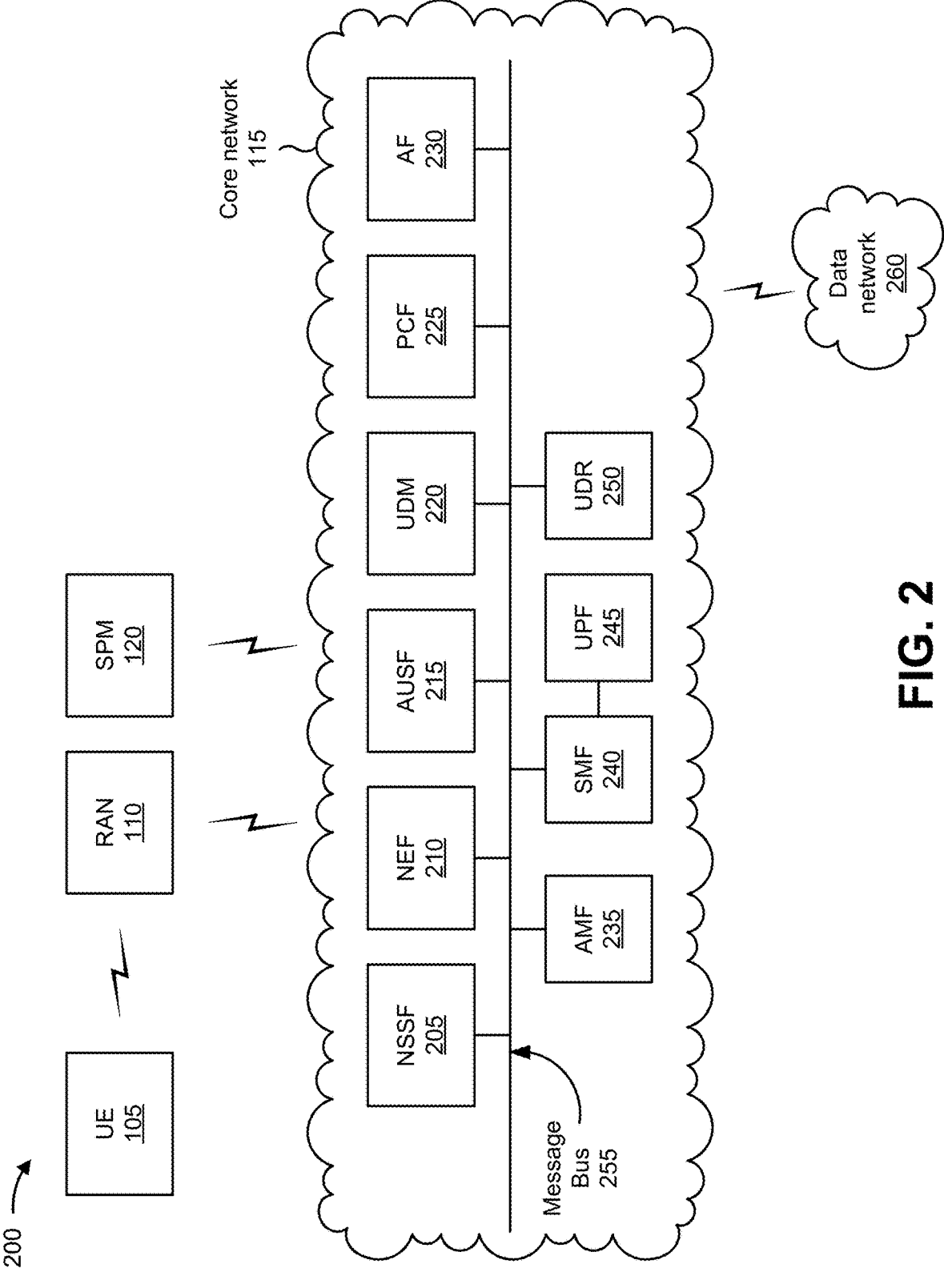
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, the SPM 120, and a data network 260. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or side-link communications of the UE 105 covered by the RAN 110).

The SPM 120 may include one or more devices capable of receiving, generating, storing, processing, providing, and/or routing information, as described elsewhere herein. The SPM 120 may include a communication device and/or a computing device. For example, the SPM 120 may include a server, such as an application server, a client server, a web server, a database server, a host server, a proxy server, a virtual server (e.g., executing on computing hardware), or a server in a cloud computing system. In some implementations, the SPM 120 may include computing hardware used in a cloud computing environment.

In some implementations, the core network 115 may include an example functional architecture in which systems and/or methods described herein may be implemented. For example, the core network 115 may include an example architecture of a 5G Next Generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) device 220, a policy control function (PCF) 225, an application function (AF) 230, an access and mobility management function (AMF) 235, a session management function (SMF) 240, a user plane function (UPF) 245, and/or a unified data repository (UDR) 250. These functional elements may be communicatively connected via a message bus 255. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM 220 includes one or more devices that store user data and profiles in the wireless telecommunications system. The UDM 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment Internet protocol (IP) address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The UDR 250 includes one or more devices that provide a converged repository used by other network functions to store data. The UDR 250 may be implemented as cloud native function and may provide a unified database for storing application, subscription, authentication, service authorization, policy data, session binding, application state information, and/or the like.

The message bus 255 represents a communication structure for communication among the functional elements. In other words, the message bus 255 may permit communication between two or more functional elements.

The data network 260 includes one or more wired and/or wireless data networks. For example, the data network 260 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
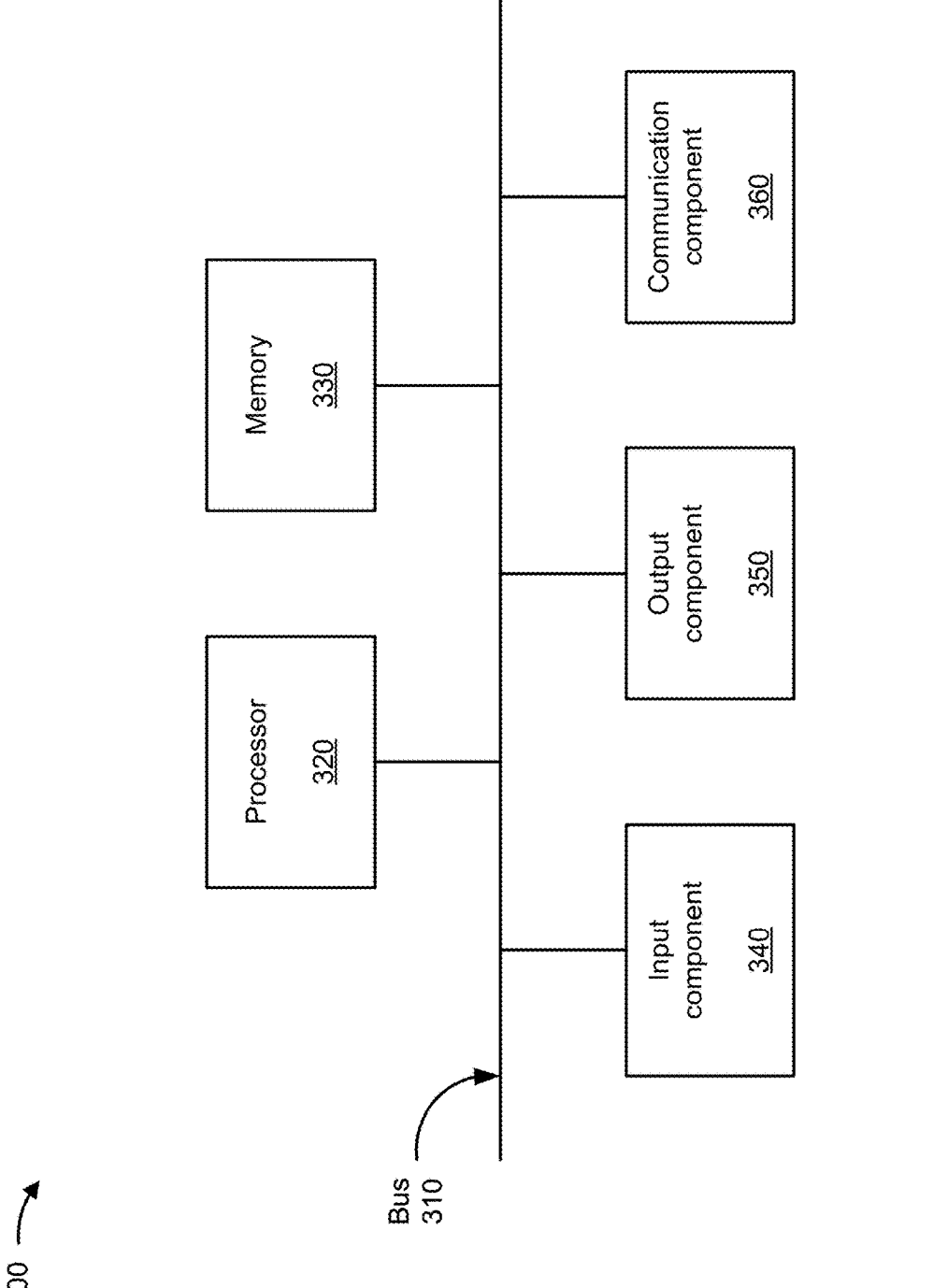
FIG. 3 is a diagram of example components of one or more devices of FIG. 2.

FIG. 3 is a diagram of example components of a device 300, which may correspond to the UE 105, the RAN 110, the SPM 120, the NSSF 205, the NEF 210, the AUSF 215, the UDM 220, the PCF 225, the AF 230, the AMF 235, the SMF 240, the UPF 245, and/or the UDR 250. In some implementations, the UE 105, the RAN 110, the SPM 120, the NSSF 205, the NEF 210, the AUSF 215, the UDM 220, the PCF 225, the AF 230, the AMF 235, the SMF 240, the UPF 245, and/or the UDR 250 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for allocating network slices to applications via a network enabled function. In some implementations, one or more process blocks of FIG. 4 may be performed by a device (e.g., the SPM 120). In some implementations, one or more process blocks of FIG. 4 may be performed by another device or a group of devices separate from or including the device, such as a UE (e.g., the UE 105), an SMF, and/or the like. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving data identifying network slices and applications permitted on the network slices (block 410). For example, the device may receive data identifying network slices and applications permitted on the network slices, as described above. In some implementations, receiving the data identifying the network slices and the applications permitted on the network slices includes receiving the data identifying the network slices and the applications permitted on the network slices from a network administrator associated with the device.

As further shown in FIG. 4, process 400 may include receiving data identifying addresses of the applications permitted on the network slices (block 420). For example, the device may receive data identifying addresses of the applications permitted on the network slices, as described above. In some implementations, receiving the data identifying the addresses of the applications permitted on the network slices includes receiving the data identifying addresses of the applications permitted on the network slices from a domain name server.

As further shown in FIG. 4, process 400 may include providing, to a UE, a list of the network slices and the applications permitted on the network slices (block 430). For example, the device may provide, to a UE, a list of the network slices and the applications permitted on the network slices, as described above.

As further shown in FIG. 4, process 400 may include receiving, from the UE, a UE identifier and subscribed to applications from the list (block 440). For example, the device may receive, from the UE, a UE identifier and subscribed to applications from the list, as described above. In some implementations, the UE is configured to subscribe to the applications from the list of the network slices and the applications permitted on the network slices.

As further shown in FIG. 4, process 400 may include creating rules for the subscribed to applications and corresponding network slices (block 450). For example, the device may create rules for the subscribed to applications and corresponding network slices, as described above. In some implementations, the rules for the subscribed to applications and the corresponding network slices are UE route selection policy rules. In some implementations, the rules for the subscribed to applications and the corresponding network slices include data identifying addresses of the subscribed to applications, ports associated with the subscribed to applications, network slice identifiers of the corresponding network slices, and a domain name server associated with the subscribed to applications.

As further shown in FIG. 4, process 400 may include associating the rules for the subscribed to applications and the corresponding network slices with the UE identifier (block 460). For example, the device may associate the rules for the subscribed to applications and the corresponding network slices with the UE identifier, as described above.

As further shown in FIG. 4, process 400 may include receiving, from a first network function, a request for the rules associated with the UE identifier, the subscribed to applications, and the corresponding network slices (block 470). For example, the device may receive, from a first network function, a request for the rules associated with the UE identifier, the subscribed to applications, and the corresponding network slices, as described above. In some implementations, the first network function is configured to generate the request for the rules based on receiving, from the UE, a network attach that includes the UE identifier.

As further shown in FIG. 4, process 400 may include providing, based on the request, the rules to the UE via the first network function (block 480). For example, the device may provide, based on the request, the rules to the UE via the first network function, as described above. In some implementations, the first network function is configured to receive the rules from the device and provide the rules to the UE. In some implementations, the UE is configured to utilize the rules to separate the subscribed to applications onto the corresponding network slices for uplink traffic.

In some implementations, process 400 includes receiving, from a second network function, another request for the rules, and providing, to the second network function, the rules based on the other request and to cause the second network function to set up traffic flows in one or more third network functions based on the rules. In some implementations, the first network function is configured to instruct the second network function to request the rules from the device. In some implementations, the one or more third network functions are configured to utilize the rules to separate the subscribed to applications onto the corresponding network slices for downlink traffic.

In some implementations, process 400 includes generating the list based on the data identifying the network slices and the applications permitted on the network slices and the data identifying the addresses of the applications permitted on the network slices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like. To the extent the afore-mentioned implementations collect, store, or employ per-sonal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a com-bination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combina-tion with "either" or "only one of").

In the preceding specification, various example embodi-ments have been described with reference to the accompa-nying drawings. It will, however, be evident that various modifications and changes may be made thereto, and addi-tional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, data identifying network slices and applications permitted on the network slices;
receiving, by the device, data identifying addresses of the applications permitted on the network slices;
providing, by the device and to a user equipment (UE), a list of the network slices and the applications permitted on the network slices;
receiving, by the device and from the UE, a UE identifier and subscribed to applications from the list;
creating, by the device, rules for the subscribed to appli-cations and corresponding network slices;
associating, by the device, the rules for the subscribed to applications and the corresponding network slices with the UE identifier;
receiving, by the device and from a first network function, a request for the rules associated with the UE identifier, the subscribed to applications, and the corresponding network slices; and
providing, by the device and based on the request, the rules to the UE via the first network function.

2. The method of claim 1, further comprising:
receiving, from a second network function, another request for the rules; and
providing, to the second network function, the rules based on the other request and to cause the second network function to set up traffic flows in one or more third network functions based on the rules.

3. The method of claim 2, wherein the first network function is configured to instruct the second network func-tion to request the rules from the device.

4. The method of claim 2, wherein the one or more third network functions are configured to utilize the rules to separate the subscribed to applications onto the correspond-ing network slices for downlink traffic.

5. The method of claim 1, wherein the UE is configured to select the subscribed to applications from the list of the network slices and the applications permitted on the network slices.

6. The method of claim 1, wherein the first network function is configured to generate the request for the rules based on receiving, from the UE, a network attach that includes the UE identifier.

7. The method of claim 1, wherein the first network function is configured to receive the rules from the device and provide the rules to the UE.

8. A device, comprising:
one or more processors configured to:
receive data identifying network slices and applications permitted on the network slices;
receive data identifying addresses of the applications permitted on the network slices;

provide, to a user equipment (UE), a list of the network slices and the applications permitted on the network slices;

receive, from the UE, a UE identifier and subscribed to applications from the list;

create rules for the subscribed to applications and corresponding network slices;

associate the rules for the subscribed to applications and the corresponding network slices with the UE identifier;

receive, from a first network function, a request for the rules associated with the UE identifier, the subscribed to applications, and the corresponding network slices;

provide, based on the request, the rules to the UE via the first network function;

receive, from a second network function, another request for the rules; and provide, to the second network function, the rules based on the other request and to cause the second network function to set up traffic flows in one or more third network functions based on the rules.

9. The device of claim 8, wherein the UE is configured to utilize the rules to separate the subscribed to applications onto the corresponding network slices for uplink traffic.

10. The device of claim 8, wherein the one or more processors, to receive the data identifying the network slices and the applications permitted on the network slices, are configured to:

receive the data identifying the network slices and the applications permitted on the network slices from a network administrator associated with the device.

11. The device of claim 8, wherein the one or more processors, to receive the data identifying the addresses of the applications permitted on the network slices, are configured to:

receive the data identifying addresses of the applications permitted on the network slices from a domain name server.

12. The device of claim 8, wherein the one or more processors are further configured to:

generate the list based on the data identifying the network slices and the applications permitted on the network slices and the data identifying the addresses of the applications permitted on the network slices.

13. The device of claim 8, wherein the rules for the subscribed to applications and the corresponding network slices are UE route selection policy rules.

14. The device of claim 8, wherein the rules for the subscribed to applications and the corresponding network slices include data identifying addresses of the subscribed to applications, ports associated with the subscribed to applications, network slice identifiers of the corresponding network slices, and a domain name server associated with the subscribed to applications.

15. A non-transitory computer-readable medium storing a set of instructions, the set of instructions comprising:

one or more instructions that, when executed by one or more processors of a device, cause the device to:

receive data identifying network slices and applications permitted on the network slices;

receive data identifying addresses of the applications permitted on the network slices;

provide, to a user equipment (UE), a list of the network slices and the applications permitted on the network slices;

receive, from the UE, a UE identifier and subscribed to applications from the list;

create rules for the subscribed to applications and corresponding network slices;

associate the rules for the subscribed to applications and the corresponding network slices with the UE identifier;

receive, from a first network function, a request for the rules associated with the UE identifier, the subscribed to applications, and the corresponding network slices; and provide, based on the request, the rules to the UE, via the first network function, to cause the UE to utilize the rules to separate the subscribed to applications onto the corresponding network slices for uplink traffic.

16. The non-transitory computer-readable medium of claim 15, wherein the one or more instructions further cause the device to:

receive, from a second network function, another request for the rules; and provide, to the second network function, the rules based on the other request and to cause the second network function to set up traffic flows in one or more third network functions based on the rules and to cause the one or more third network functions to utilize the rules to separate the subscribed to applications onto the corresponding network slices for downlink traffic.

17. The non-transitory computer-readable medium of claim 15, wherein the first network function is configured to generate the request for the rules based on receiving, from the UE, a network attach that includes the UE identifier.

18. The non-transitory computer-readable medium of claim 15, wherein the one or more instructions, that cause the device to receive the data identifying the network slices and the applications permitted on the network slices, cause the device to:

receive the data identifying the network slices and the applications permitted on the network slices from a network administrator associated with the device.

19. The non-transitory computer-readable medium of claim 15, wherein the one or more instructions, that cause the device to receive the data identifying the addresses of the applications permitted on the network slices, cause the device to:

receive the data identifying addresses of the applications permitted on the network slices from a domain name server.

20. The non-transitory computer-readable medium of claim 15, wherein the one or more instructions further cause the device to:

generate the list based on the data identifying the network slices and the applications permitted on the network slices and the data identifying the addresses of the applications permitted on the network slices.

* * * * *